Jan. 22, 1963        G. H. SYMONS        3,074,265
PRESSURE DIFFERENTIAL TESTER
Filed Jan. 26, 1959
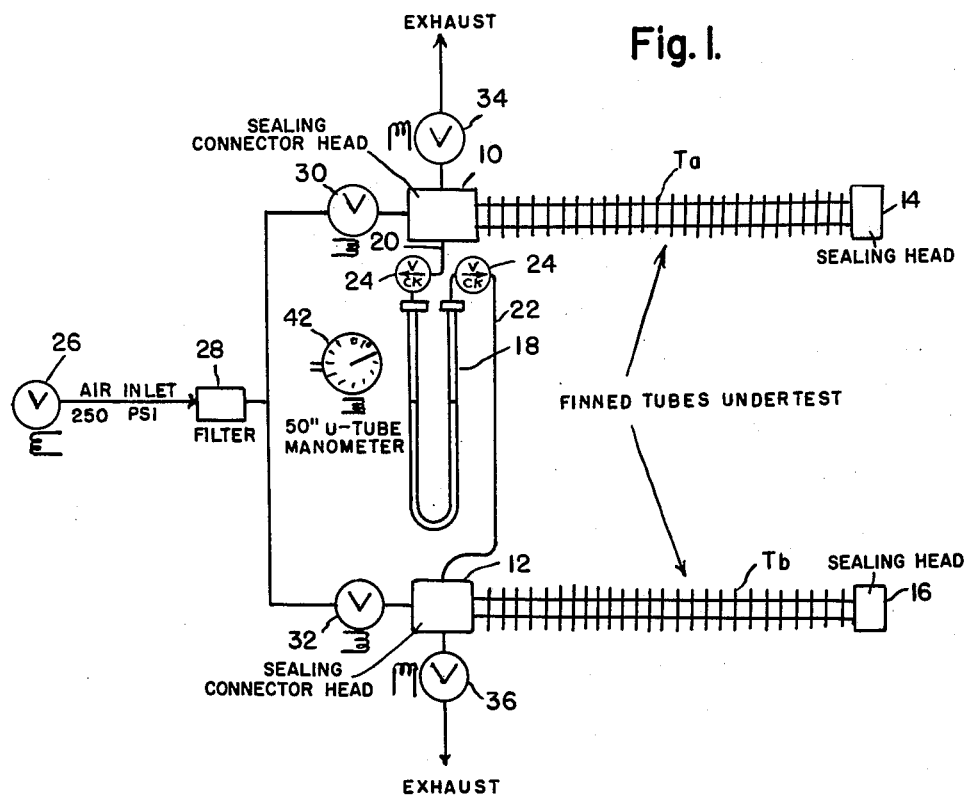
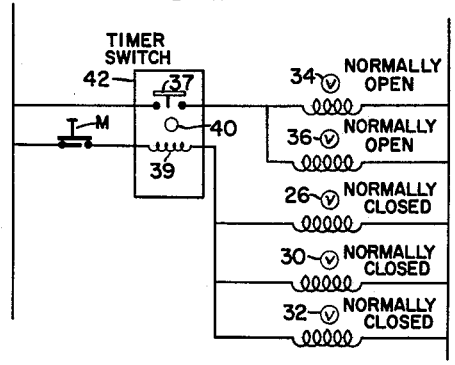
INVENTOR.
GEORGE H. SYMONS
BY *Whittemore,*
*Hulbert & Belknap*
ATTORNEYS

United States Patent Office 3,074,265
Patented Jan. 22, 1963

---

3,074,265
PRESSURE DIFFERENTIAL TESTER
George Henry Symons, Detroit, Mich., assignor to Calumet & Hecla, Inc., Allen Park, Mich., a corporation of Michigan
Filed Jan. 26, 1959, Ser. No. 788,835
4 Claims. (Cl. 73—49.2)

The present invention relates to a pressure differential tester, and more particularly to a tester designed for testing tubes and tube assemblies.

It is an object of the present invention to provide apparatus for detecting tube leaks with increased speed, facility, and certainty.

It is a further object of the present invention to provide means for testing tube leaks by a pressure differential method capable of detecting leaks as small as .08 cc. per minute or one bubble per minute in a ten-second cycle.

It is a further object of the present invention to use a pressure differential system for detecting tube leaks which minimizes human error in visually observing small leaks, reduces operator fatigue, and through the elimination of water on the outside of the tubes, produces a clean tube meeting exacting specifications.

It is a further object of the present invention to provide means for testing tubes and/or tube assemblies for leakage comprising means for subjecting a pair of tubes or tube assemblies, preferably identical, to identical pressure, trapping the pressure within the tubes and/or tube assemblies, and comparing the pressure drop therein.

More specifically, it is an object of the present invention to provide a comparison tube leakage tester comprising means for trapping identical pressure in tubes to be compared and connecting the tubes by pressure comparison means preferably in the form of a manometer.

It is a further object of the present invention to provide tube testing apparatus comprising a manometer for connection to a pair of tubes, separate inlet and outlet valves for each of said tubes, and means responsive to the pressure in each tube for effecting closure of the inlet valve thereof to trap fluid pressure within the tubes.

It is a further object of the present invention to provide a tube testing apparatus as described in the preceding paragraph in combination with a timer to permit the operator to take a manometer reading after predetermined uniformly timed intervals.

It is a further object of the present invention to provide apparatus as described in the preceding paragraph comprising solenoid actuated outlet valves adapted to be opened upon expiration of a predetermined interval as determined by the timer to effect release of fluid pressure from within said tubes.

It is a further object of the present invention to provide tube comparison apparatus comprising a manometer adapted to be connected between two tubes to be compared, separate inlet and outlet valves for admitting fluid to each of said tubes and for trapping fluid within the system composed of two tubes and the manometer, and check valves between each of said tubes and the manometer effective to prevent substantial fluid flow through said manometer.

Other objects and features of the invention will become apparent as the description proceeds, especially when taken in conjunction with the accompanying drawings, illustrating a preferred embodiment of the invention, wherein:

FIGURE 1 is a diagrammatic view of the pressure differential tester.

FIGURE 2 is a simplified wiring diagram.

In recent years, the trend has been toward producing lighter wall tubing both in seamless plain surface and integrally finned tubing. The effect of small metallurgical or mechanical imperfections in the tube or surface of the tube increased the susceptibility for small leaks. The use of eddy-current type of nondestructive testing has virtually eliminated the quality problem in seamless plain surface tubing. Because of the irregular surfaces in extended integrally finned tubing, this method has not proved practical up to the present time. The most common method used to assure that the finished material is free of this type of defect is to subject it to an air-under-water test.

The conventional air-under-water test consists of subjecting the tube to an internal pressure such as 250 p.s.i. and immersing the tube under water. Any leaks are detected by the bubbling action of the air escaping from the tube. While this test normally detects leaking tubes, it has a few undesirable aspects. It wets the tube which in turn may cause staining and requires subsequent drying. The entire tube must be observed, extensive tanks are often required and the entire operation is messy.

From extensive field reports, it became apparent that the failures due to leakers were of the magnitude that required more than the usual five-second air-under-water test. Minute leakers that were detected under pressure after assembly into units revealed that either a more sensitive test had to be developed or excessively long test cycles (up to five minutes) were necessary to give customer quality assurance.

With the introduction of extremely rigid cleanliness requirements for atomic energy applications, the need for a clean, waterstain-free tube accelerated the development program for a tester which did not require water as a testing medium.

The pressure differential test was developed in an attempt to eliminate the undesirable features of the air-under-water-test. This method also lends itself to the testing of long-lengths or tube configurations not readily adaptable to the other test.

The pressure differential test consists of simultaneously applying an air pressure to two of the units to be tested. The pressurized units are then isolated from the pressure supply and the resulting pressure in one unit is compared to the resulting pressure in the other unit by means of a U-tube manometer connected between the two units. Any differential in pressure due to a leak in either unit is readily detected by the relative positions of the manometer columns.

Referring now to the drawings, the test apparatus comprises a fixture having sealing connector heads 10 and 12 into which the ends of finned tubes Ta and Tb are connected. At the opposite end of each of the tubes Ta and Tb are provided sealing heads 14 and 16 respectively. A manometer 18 is connected between the heads 10 and 12 by conduits 20 and 22 respectively, and check valves 24 are provided in the conduits 20 and 22 respectively. The check valves are lightly biased toward open position so that pressure differential may be transmitted in a gradual manner to the manometer but are adapted to be closed upon any substantial flow. The check valves thus serve the function of preventing a substantial fluid flow through the manometer 18 which might displace the liquid from the manometer tube.

Air under substantial and controlled pressure, as for example 250 p.s.i., is admitted through a normally closed supply valve 26 and filter 28 to the inlet valves 30 and 32. Outlet valves 34 and 36 are connected to the heads 10 and 12 respectively. Air is admitted past the valves 30 and 32 to the interior of the tubes Ta and Tb at the predetermined pressure. A timer 42 is provided adapted to time a predetermined interval as for example ten seconds.

While the test apparatus may be operated manually, it is desirable to employ solenoid actuated inlet valves 30 and 32 and solenoid actuated outlet valves 34 and 36.

Conveniently, the inlet valves 30 and 32 may be normally closed valves provided with spring means holding the valves closed except when the solenoids associated therewith are energized. At the same time, the outlet valves 34 and 36 may be normally open; that is, provided with spring means normally maintaining the valves in open condition but adapted to be moved and retained in closed position so long as the solenoid windings associated therewith are energized.

The timer is in the form of a timer switch having a solenoid winding associated therewith effective to set the timer to zero and to maintain it at zero setting so long as the timer solenoid is energized. When the timer solenoid is de-energized, the timer starts to time and at a predetermined setting operates the switch contacts associated therewith. In the present case the timer switch is connected to control the circuit to the solenoid windings of the outlet valves 34 and 36. The timer switch contacts 37 are closed by setting of the timer to zero and open when the timer times out after the predetermined interval.

With the foregoing in mind, and referring particularly to FIGURE 2 it will be apparent that when a manual switch M is closed, the solenoids associated with supply valve 26, inlet valves 30 and 32, and the winding 39 of timer switch 42 are energized and remain energized so long as the manual switch is closed.

Energization of the timer winding 39 closes a circuit to the solenoids of the exhaust valves 34 and 36, thereby closing the valves. At this time air under the predetermined pressure flows past the inlet valves 30 and 32 and fills the tubes Ta and Tb at identical pressure. This pressure is effective on opposite ends of the manometer U-tube 18 so that the columns of liquid therein are at the same height. When the operator opens the manual control switch M, normally closed supply valve 26 and inlet valves 30 and 32 close, thus trapping air at the predetermined pressure within the tubes Ta and Tb. As soon as the manual switch is opened the timing mechanism 40 starts to time its predetermined interval, as for example ten seconds. The operator observes the level of the columns of liquid in the manometer tube and notes the difference in height of these columns, if any, at the expiration of ten seconds. Upon expiration of the timed interval the timer switch opens and normally open outlet valves 34 and 36 move to open position by reason of the resilient means associated therewith, thus terminating a measuring cycle.

The following table represents an evaluation of pressure differential sensitivity:

| Leak Rate (cc./Min.) | Total Differential (Inches) | Total Time (seconds) | Total Differential Inches Per Sec. | Total Differential 10-Second Cycle | Hole Diameter inches |
|---|---|---|---|---|---|
| 20,000 | 40 | 2 | 20.0 | 200 | .016 |
| 2,500 | 25 | 3 | 8.3 | 83 | .007 |
| 133 | 10 | 10 | 1.0 | 10 | |
| 2.5 | 6.2 | 10 | 0.62 | 6.2 | Bubbles/Min. |
| 1.2 | 3.0 | 10 | 0.30 | 3.0 | 21 |
| 0.6 | 1.0 | 10 | 0.10 | 1.0 | 10 |
| 0.17 | 0.4 | 10 | 0.04 | 0.4 | 2 |
| 0.084 | 0.2 | 10 | 0.02 | 0.2 | 1 |

It is to be observed that with the minimum leak corresponding to one bubble per minute, a manometer differential of .02" is obtained in a ten-second test cycle. This differential is of course readily observable and indicates the substantial improvement in speed of testing which is attributable to the present invention.

While leaks may be determined by comparison of a test tube against a known impervious tube, it has been found satisfactory to compare two test specimens at the same time. The probability that two test specimens would have identical leakage characteristics is negligible.

The drawing and the foregoing specification constitute a description of the improved pressure differential tester in such full, clear, concise and exact terms as to enable any person skilled in the art to practice the invention, the scope of which is indicated by the appended claims.

What I claim as my invention is:

1. Apparatus for the rapid production testing of tubes for leakage comprising a pair of sealing heads for attachment to the open ends of a pair of tubes to be tested, the other ends of the tubes being closed, a supply of air under high pressure, separate supply passages connecting said heads in parallel to said air supply to charge the interior of the tubes connected to said heads simultaneously with air under identical high pressure, a manometer tube having its ends connected to said heads and thence to the interior of the tubes, outlet passages connected in parallel to said heads and thence to the interior of the tubes, inlet valve means for supplying air simultaneously through said heads to the tubes, an outlet valve in each of said outlet passages, solenoid means for actuating each of said outlet valves, and means for actuating said solenoid means simultaneously to insure simultaneous exhaust of high pressure air from both of said tubes.

2. Apparatus for the rapid production testing of tubes for leakage comprising a pair of sealing heads for attachment to the open ends of a pair of tubes to be tested, the other ends of the tubes being closed, a supply of air under high pressure, separate supply passages connecting said heads in parallel to said air supply, inlet valve means adapted when open to charge the interior of the tubes connected to said heads simultaneously with air under identical high pressure and adapted when closed to trap the high pressure charge of air in said tubes, a manometer tube having its ends connected to said heads and thence to the interior of the tubes, outlet passages connected in parallel to said heads and thence to the interior of the tubes, outlet valve means controlling the flow of air through said outlet passages for exhausting air simultaneously from the tubes, and timing means having a timing cycle initiated by closure of said inlet valve means, solenoid means in control of said outlet valve means, said timing means being operable upon completion of the timing cycle to actuate said solenoid means to open said outlet valve means.

3. Apparatus for the rapid production testing of tubes for leakage comprising a pair of sealing heads for attachment to the open ends of a pair of tubes to be tested, the other ends of the tubes being closed, a supply of air under high pressure, separate supply passages connecting said heads in parallel to said air supply to charge the interior of the tubes connected to said heads simultaneously with air under identical high pressure, a manometer tube having its ends connected to said heads and thence to the interior of the tubes, outlet passages connected in parallel to said heads and thence to the interior of the tubes, inlet valve means for supplying air simultaneously through said heads to the tubes, outlet valve means controlling the flow of air through said outlet passages for exhausting air from the tubes, solenoid means for actuating said outlet valve means to insure simultaneous exhaust of high pressure air from the tubes.

4. Apparatus as defined in claim 3 which comprises a pair of check valves, one connected between each end of said manometer tube and one of said heads.

(References on following page)

References Cited in the file of this patent

UNITED STATES PATENTS

| | | |
|---|---|---|
| 1,325,747 | McGrath | Dec. 23, 1919 |
| 1,720,934 | Toleik | July 16, 1929 |
| 2,467,767 | Mertler | Apr. 19, 1949 |
| 2,573,053 | Pearlman | Oct. 30, 1951 |
| 2,603,230 | Kreiger | July 15, 1952 |
| 2,853,874 | Mennesson | Sept. 30, 1958 |
| 2,855,777 | Garrett | Oct. 14, 1958 |
| 2,872,806 | Mamzic | Feb. 10, 1959 |
| 2,920,159 | Snyder | Jan. 5, 1960 |